Figure 1:
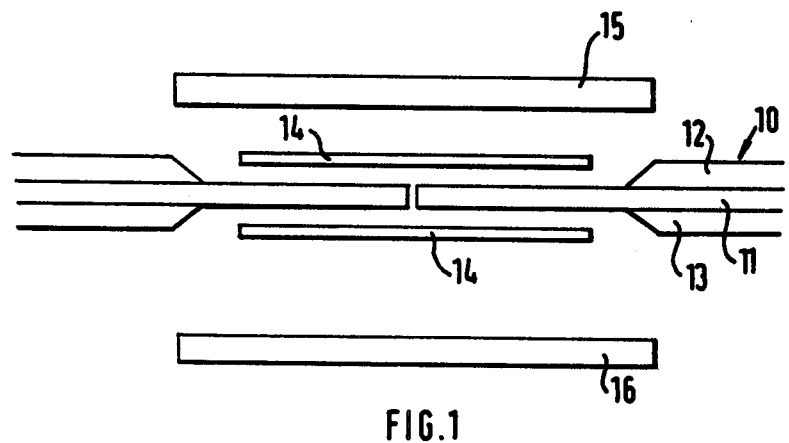

United States Patent

Möring

[11] 4,056,016
[45] Nov. 1, 1977

[54] BELTING
[75] Inventor: Peter Lothar Ernst Möring, Sutton Coldfield, England
[73] Assignee: Dunlop Limited, London, England
[21] Appl. No.: 726,781
[22] Filed: Sept. 27, 1976
[30] Foreign Application Priority Data
Oct. 3, 1975  United Kingdom ............... 40499/75
[51] Int. Cl.² ............................................... F16G 1/00
[52] U.S. Cl. .................................................. 74/231 J
[58] Field of Search ....................................... 74/231 J
[56] References Cited
U.S. PATENT DOCUMENTS
3,988,940  11/1976  Szonn ................................. 74/231 J Primary Examiner—Leonard H. Gerin
Attorney, Agent, or Firm—Stevens, Davis, Miller & Mosher

[57] ABSTRACT

A method of joining two ends of belting having a layer of cover material and an embedded longitudinal reinforcement structure which is longitudinally compressible comprising removing the cover material from the reinforcement structure a short distance from each end of the belting, placing uncovered reinforcement structure ends in end-to-end relationship, and applying a substantially weftless fabric having a compression absorbing warp material so that the warp members are parallel to the length of the belting and the fabric layer overlies the ends, applying cover material and setting or vulcanizing the assembly.

19 Claims, 2 Drawing Figures

BELTING

This invention relates to belting and in particular to a method of joining belting having an embedded reinforcement structure of warp and/or weft members and formed of material able to absorb compressive forces.

A material which is able to absorb compressive forces is defined herein as a material which has sufficient crimp and/or twist in members extending in a warp and/or weft direction to allow absorption of compression in said direction.

Methods of joining are required to provide a joint which is of similar strength or rating to the belting, and also of similar flexibility so that localized harder or stiffer regions are largely avoided. Furthermore a joint which may be effected outside a belting factory is preferred so that belting may be assembled on site and damaged or worn sections of a long belt replaced.

An object of the present invention is to provide a method of and means for joining belting which meets the above requirements.

According to one aspect of the present invention a method of joining two ends of belting having a layer of cover material and an embedded longitudinal reinforcement structure which is longitudinally compressible as hereinbefore defined comprises removing the cover material from the reinforcement structure for a short distance from each end of the belting, placing the ends of the uncovered reinforcement structures in end-to-end relationship, applying a layer of substantially weftless fabric having a compression absorbing warp material as hereinbefore defined so that the warp members are parallel to the length of the belting and the fabric layer overlies the ends, applying cover material and setting or vulcanising the assembly.

The substantially weftless fabric is preferably a tire cord fabric and may be truly weftless, or have the warp yarns held together by weft yarns which are relatively weak compared with the warp yarns which are widely spaced e.g. (8 ends per 10 cm) or have the yarns embedded in a flexible matrix material. The warp may comprise twisted singles or plied yarns. The tire cord fabric may in addition be coated with a flexible matrix material.

Preferably a layer of fabric is applied above and a layer of fabric is applied below the reinforcement structure.

Preferably an adhesive or an adhesion promoter is applied to the reinforcement structure surfaces before placing the ends together and/or after placing the ends together and before applying the fabric. Furthermore a thin interlayer of elastomer may be applied to the reinforcement structure to overlap the join before applying the fabric.

The ends of belting to be joined may be cut to form a finger joint (i.e. interleaved projections) or may be cut straight to form a butt joint. Preferably the ends are bias cut to provide a joint length greater than the width of the belting and a preferred bias angle is 60° to the length of the belting.

The assembled joint may be set in a portable belting press and clamps to maintain the ends in end-to-end relationship may be applied prior to closing the press. In the case of PVC belting or belting having a PVC coated reinforcement structure and rubber covers the press is cooled before opening.

The cover material may be removed mechanically; i.e. by cutting or the use of a hot knife, or by using heat to effect delamination. Preferably the cover material is cut-back at an angle to the surface of the reinforcement structure to form a bevelled edge. One preferred angle of cut-back is 45°.

Another aspect of the invention provides a belt joint made according to the method described.

The joint may be used with standard belting reinforced by woven reinforcement material but it is particularly useful with belting of the solid woven type. By solid woven belting is meant belting having two or more plies of woven warp and weft members in which the plies are interconnected by means of warp members which engage each ply. The interconnecting warp members may be part of the warp of one of the plies or additional warp members.

One suitable substantially weftless fabric is tire cord fabric comprising a warp of 2/140 tex nylon cords at 95 ends per 100 mm each cord having a twist of 370 turns per m (Z) in the singles and 370 turns per m (S) in the folding and a weft of 20–21 tex spun staple yarn at 8 ends per 100 mm to produce a resultant warp strength of 200 KN/m.

As an alternative to a simple straight butt joint between the ends of the reinforcement structures the ends may be notched to form a finger joint or other well known arrangement.

One or more layers of weftless fabric may be used and these may be above, below or both above and below the reinforcement structure.

The interlayer, when used, may be of rubber, PVC or other material compatible to the type of belting being joined.

Figure 2:
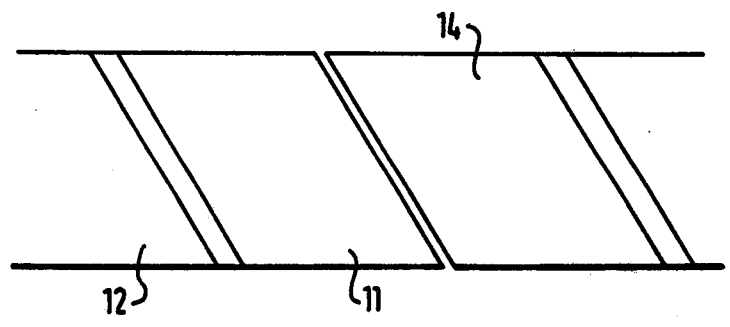

One embodiment of the invention will now be described, by way of example, with reference to the accompanying diagrammatic drawings in which:

FIG. 1 is an exploded side view of a joint, and
FIG. 2 is a plan view of the joint of FIG. 1.

Belting 10 comprises a reinforcement carcass 11, an upper rubber cover 12, and a lower rubber cover 13. The reinforcement carcass 11 comprises four plies of woven warp and weft members in which the plies are interconnected by means of warp members which engage each ply, and the plies of the reinforcement carcass are embedded in rubber which is vulcanized with the cover layers 12, 13.

To make a joint the belting ends to be connected were cut at a 60° bias angle as shown in FIG. 2. Each end then had the ends of the upper and lower rubber cover layers 12, 13 separated from the reinforcement carcass 11.

The uncovered ends were then placed in end to end contact and covered on both sides by substantially weftless tire cord fabric 14 arranged such that the warp yarns of the fabric extended parallel to the direction of the length of the belting.

The tire cord fabric was of the kind described above and comprising a warp of 2/140 tex nylon cords at 95 ends per 100 mm each cord having a twist of 370 turns per *m* (Z) in the singles and 370 turns per *m* (S) in the folding and a weft of 20–21 tex spun staple yarn at 8 ends per 100 mm to produce a resultant warp strength of 200 KN/m. Uncured cover material sheets 15, 16 were then applied to make the joint up to the same thickness as that of the original belt, and the resultant assembly heated in a portable press to cure the material.

Having now described my invention - what I claim is:

1. A method of joining two ends of belting having a layer of cover material and an embedded longitudinal reinforcement structure which is longitudinally compressible as hereinbefore defined comprising removing the cover material from the reinforcement structure a short distance from each end of the belting, placing uncovered reinforcement structure ends in end-to-end relationship, and applying a substantially weftless fabric having a compression absorbing warp material as hereinbefore defined so that the warp members are parallel to the length of the belting and the fabric layer overlies the ends, applying cover material and setting or vulcanizing the assembly.

2. A method according to claim 1 wherein uncovered reinforcement structure ends are placed in end-to-end contact.

3. A method according to claim 1 wherein an adhesive is applied to the reinforcement structure surfaces before the fabric layer is applied.

4. A method according to claim 1 wherein an adhesion promoter is applied to the reinforcement structure surfaces before the fabric layer is applied.

5. A method according to claim 1 wherein an interlayer of elastomer is applied to the reinforcement structure to overlap the joint before the fabric layer is applied.

6. A method according to claim 1 wherein the assembled joint is set in a portable belting press.

7. A method according to claim 6 wherein the press is cooled before opening.

8. A method according to claim 1 wherein cover material is removed from the reinforcement structure by the use of heat to effect delamination.

9. Belting having a layer of cover material and an embedded longitudinal reinforcement structure which is longitudinally compressible, and a joint region in which ends of the embedded reinforcement structure are in end-to-end relationship and covered by an overlying layer of substantially weftless fabric having a compression absorbing warp with warp members of the fabric positioned parallel to the length of the belting.

10. Belting according to claim 9 wherein the ends of the embedded longitudinal reinforcement structure are in contact.

11. Belting according to claim 10 wherein the layer of fabric is weftless.

12. Belting according to claim 9 wherein the layer of substantially weftless fabric comprises warp yarns held together by weft yarns which are relatively weak compared with the warp yarns.

13. Belting according to claim 9 wherein the layer of substantially weftless fabric comprises warp yarns embedded in a flexible matrix material.

14. Belting according to claim 9 wherein the warp comprises twisted single yarns.

15. Belting according to claim 9 wherein the warp comprises plied yarns.

16. Belting according to claim 9 wherein a layer of fabric is provided at both sides of the reinforcement structure.

17. Belting according to claim 9 wherein an interlayer of elastomer is provided between the reinforcement structure and at least one of the layers of fabric.

18. Belting according to claim 9 wherein reinforcement structure ends are bias cut at an angle of 60°.

19. Belting according to claim 9 wherein reinforcement structure ends are cut to form a finger joint.

* * * * *